United States Patent [19]

Allen

[11] 4,286,150
[45] Aug. 25, 1981

[54] NEUTRON-NEUTRON LOGGING

[75] Inventor: Linus S. Allen, Dallas, Tex.

[73] Assignee: Mobil Oil Corporation, New York, N.Y.

[21] Appl. No.: 954,053

[22] Filed: Oct. 23, 1978

[51] Int. Cl.³ .................................................. G01V 5/00
[52] U.S. Cl. .................................... 250/270; 250/266; 250/269
[58] Field of Search ............... 250/270, 265, 269, 266, 250/264

[56] References Cited

U.S. PATENT DOCUMENTS

| | | | |
|---|---|---|---|
| 2,776,378 | 1/1957 | Youmans | 250/264 |
| 3,514,598 | 5/1970 | Youmans | 250/270 |
| 4,005,290 | 1/1977 | Allen | 250/269 |
| 4,021,666 | 5/1977 | Allen | 250/265 |

Primary Examiner—Alfred E. Smith
Assistant Examiner—Carolyn E. Fields
Attorney, Agent, or Firm—C. A. Huggett; M. G. Gilman; G. W. Hager

[57] ABSTRACT

A borehole logging tool includes a steady-state source of fast neutrons, two thermal neutron detectors, and two gamma ray detectors. A count rate meter is connected to each neutron detector. A first ratio detector provides the ratio of the outputs of the two count rate meters connected to the two thermal neutron detectors. A second ratio detector provides the ratio of the outputs of the two count rate meters connected to the two gamma ray detectors. By comparing the signals of the two ratio detectors, oil bearing zones and salt water bearing zones within the formation being logged can be distinguished and porosity can be determined.

4 Claims, 3 Drawing Figures

NEUTRON-NEUTRON LOGGING

BACKGROUND OF THE INVENTION

This invention relates to radioactive well logging and more particularly to an improved method of and system for distinguishing between oil bearing zones and salt water bearing zones in subsurface formations surrounding a borehole and for further use in determining the porosity of the formations.

In neutron-neutron logging, a steady-state source of primary radiation irradiates the formations surrounding the borehole with neutrons. The resulting secondary radiation can be measured by detectors axially spaced from such source within the borehole. The resulting secondary radiation includes generally the effect of both epithermal and thermal neutron parameters.

The epithermal neutron slowing-down length of the formation is determined primarily by the concentration of hydrogen in the formation and is affected only slightly by the formation's neutron absorption properties. Consequently, the type of fluid in the rock's pore space has little or no effect on the number of epithermal neutrons returning to the borehole as secondary radiation.

The thermal neutron diffusion length of the formation, on the other hand, is affected by the presence of oil or salt water and is significantly reduced when the pore spaces of the formation contain salt water rather than oil. The chlorine present in the salt water has a large capture cross section for thermal neutrons and, consequently, reduces the number of thermal neutrons returning to the borehole as secondary radiation. At the same time, the capture of thermal neutrons by the chlorine effects an increase in the number of thermal neutron capture gamma rays returning to the borehole as secondary radiation.

In U.S. Pat. No. 4,005,290 to Allen, there is described a neutron-neutron logging system for distinguishing between oil bearing zones and salt water bearing zones in subsurface formations surrounding a borehole and for further use in determining oil saturation of an identified oil bearing zone. In such system, a steady-state source of primary radiation is located within a borehole for irradiating the formations surrounding the borehole with fast neutrons. A first pair of detectors located at spaced-apart positions from the source within the borehole measures that secondary radiation affected predominantly by the epithermal neutron parameters of the formation. A second pair of detectors located at spaced-apart positions from the source within the borehole measures that secondary radiation affected by both the epithermal and the thermal neutron parameters of the formation. The first pair of detectors measures the intensity of epithermal neutrons returning to the borehole from the formation.

The second pair of detectors may measure the intensity of either thermal neutrons or thermal neutron capture gamma rays returning to the borehole from the formation. A ratio is taken of the measurements from the first pair of detectors as an indication of the formation porosity. A ratio is taken of the measurements from the second pair of detectors as an indication of both porosity and macroscopic absorption cross section of the formation. An increase in the differential between these two ratios at any given depth indicates a change from an oil bearing zone to a salt water bearing zone in the formation at that depth, while a decrease in this differential indicates a change from a salt water bearing zone to an oil bearing zone. The differential between the two determined ratios is corrected by known factors for the macroscopic absorption cross sections of rock, oil, and water in the formation to give an indication of the amount of oil saturation in an identified oil bearing zone.

SUMMARY OF THE INVENTION

In accordance with the present invention, a steady-state source of primary radiation is located within a borehole for irradiating the formations surrounding the borehole with fast neutrons. A first pair of thermal neutron detectors located at spaced-apart positions from the source within the borehole measures that secondary radiation affected predominantly by the epithermal parameters of the formation, but also affected by the thermal neutron parameters in such a way that the intensity of this secondary radiation increases when oil rather than salt water fills the formation's rock pore space. A second pair of gamma ray detectors located at spaced-apart positions from the source within the borehole measures that secondary radiation affected predominantly by the epithermal neutron parameters of the formation, but also affected by the thermal neutron parameters in such a way that the intensity of this secondary radiation decreases when oil rather than salt water fills the formation's rock pore space. A ratio is taken of the measurements from the first pair of detectors. A ratio is also taken of the measurements from the second pair of detectors. An increase in the differential between these two ratios at any given depth indicates a change from an oil bearing zone to a salt water bearing zone in the formation at that depth, while a decrease in this differential indicates a change from a salt water bearing zone to an oil bearing zone.

In a further aspect, one of the ratio measurements is calibrated to provide a formation porosity indication by the adding or subtracting of a portion of the difference between the two ratio measurements and by a correction for known factors for the macroscopic absorption cross sections of rock, oil, and water in the formation.

DESCRIPTION OF THE PREFERRED EMBODIMENT

The present invention is directed toward a method and system of neutron-neutron logging for distinguishing oil bearing zones from salt water bearing zones in a subsurface formation and for determining formation porosity.

Figure 1:
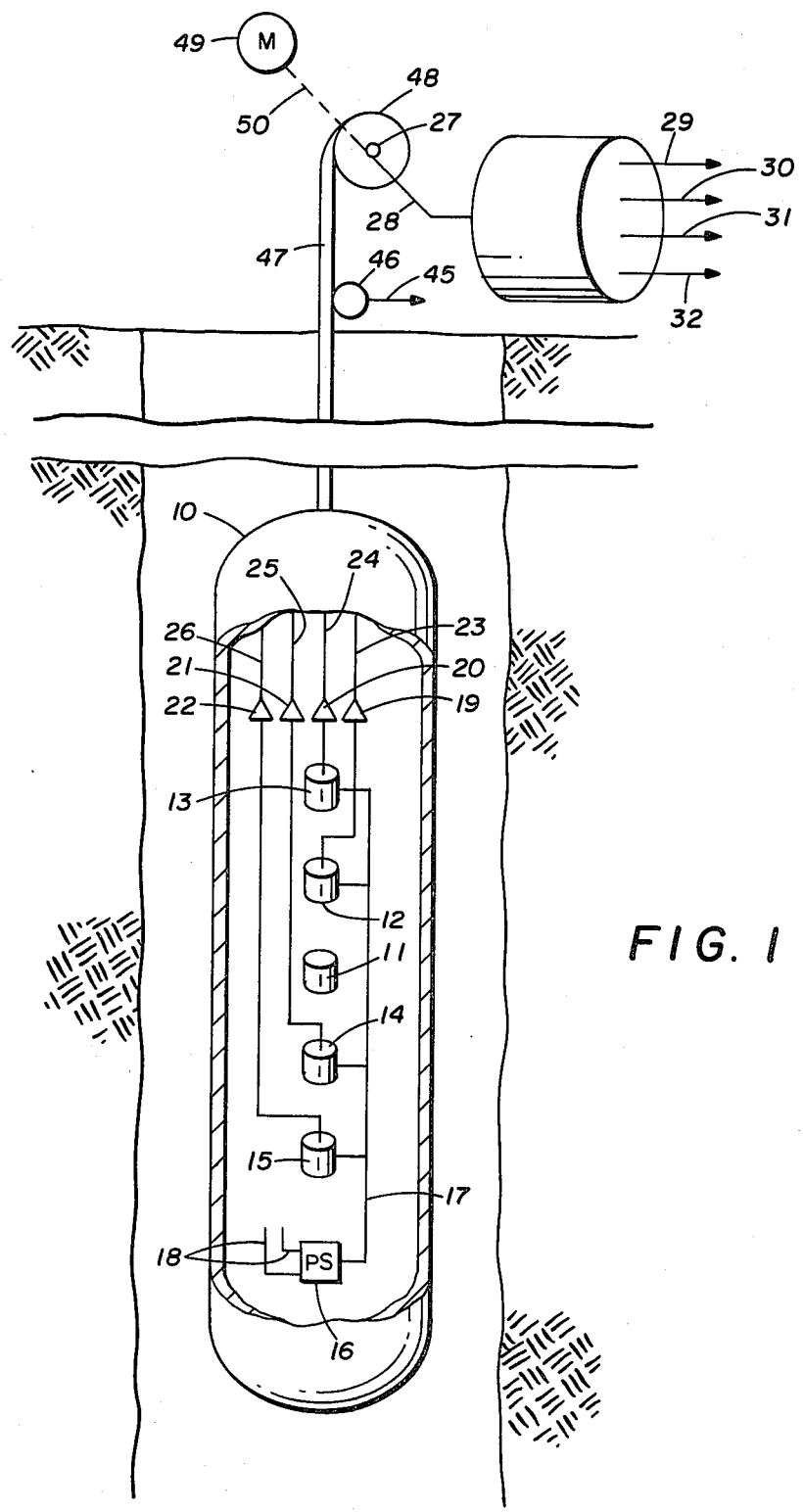
FIG. 1 illustrates a borehole logging tool for carrying out the present invention.
Figure 2:
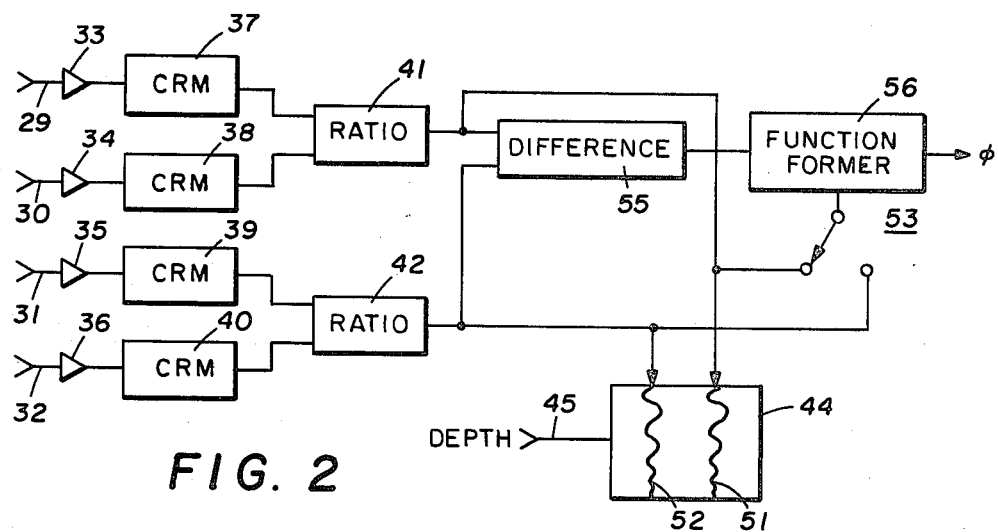
FIG. 2 illustrates an uphole recording system for use in conjunction with the borehole logging tool of FIG. 1.

Referring to FIG. 1, a borehole logging tool 10 has a steady-state neutron source 11 for irradiating the formations, two spaced-apart thermal neutron detectors 12 and 13, an two spaced-apart gamma ray detectors 14 and 15. The neutron source 11 preferably is a steady-state Am-Be fast neutron source with an average energy of about 4 million electron volts. Neutrons from the source pass into the formations where they are slowed to the thermal level. Thermal neutrons and thermal neutron capture gamma rays from the formations are in turn detected, respectively, by detectors 12-13 and 14-15. The thermal neutron detectors 12 and 13 may be proportional counters of the type disclosed in U.S. Pat. No. 3,102,198 to Bonner and filled with six atmospheres of helium-3 gas. Detectors of this type are very sensitive to thermal neutrons. Preferably, the thermal neutron detectors 12 and 13 are shielded (not shown) from direct neutron radiation from the neutron source 11. The gamma ray detectors 14 and 15 may be of the scintillation type such as a sodium iodide scintillation crystal coupled to a photomultiplier tube. A power supply 16 is located within the borehole tool 10 for supplying power to the detectors 12-15 by way of conductor 17. Current is applied to the power supply 16 from the surface by way of conductors 18. The outputs of the thermal neutron detectors 12-13 and the gamma ray detectors 14-15 are applied to amplifiers 19-22 which in turn are coupled to conductors 23-26 included in the cable 47. At the surface, the outputs from conductors 23-26 are applied by way of the slip rings 27 and brushes 28 to conductors 29-32 which extend to amplifiers 33-36 of FIG. 2. The outputs of amplifiers 33 and 34 are applied to the thermal neutron count rate meters 37 and 38, while the outputs of amplifiers 35 and 36 are applied to the gamma ray count rate meters 39 and 40.

The outputs of the thermal neutron count rate meters 37 and 38 are applied to the ratio detector 41, while the outputs of the gamma ray count rate meters 39 and 40 are applied to the ratio detector 42. Ratio detectors 41 and 42 may be of a conventional type as disclosed on pages 338 and 339 in ELECTRONIC ANALOG COMPUTERS, Gravino A. Korn and Theresa M. Korn, McGraw-Hill Book Company, Inc., New York, 1956.

Figure 3:
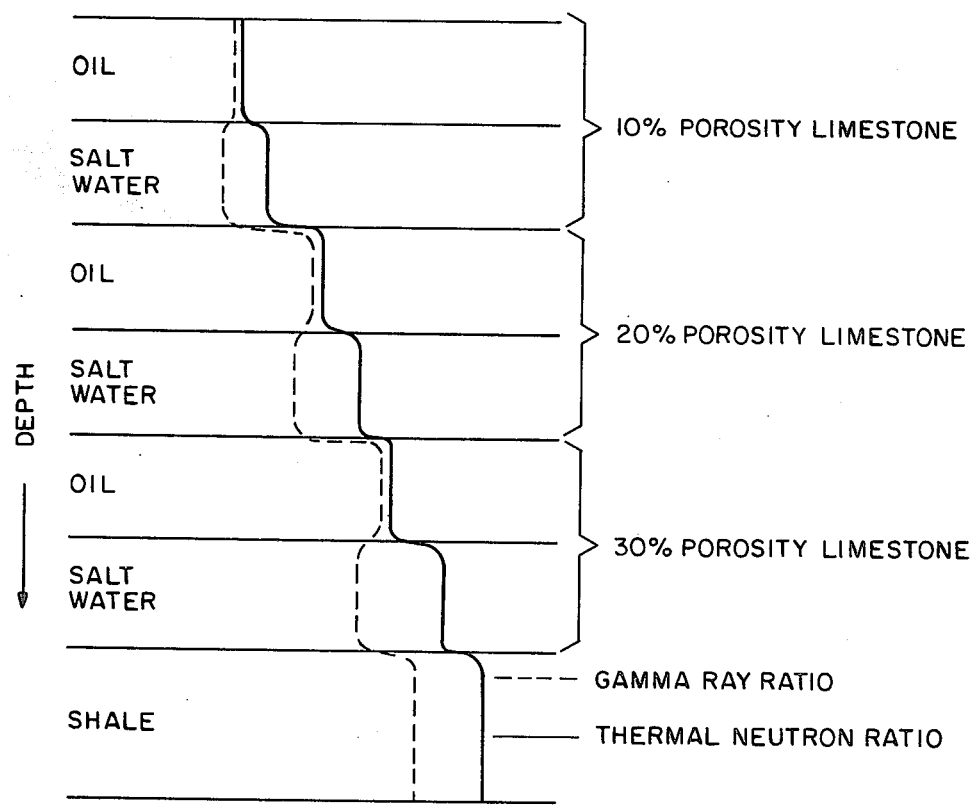
FIG. 3 illustrates in graphical form characteristics of example subsurface formations as might be encountered when logging with the borehoele system of FIG. 1.

By taking the ratio of the counting rates from the two thermal neutron detectors and from the two gamma ray detectors, signals are obtained that respond predominantly to changes in both the porosity $\phi$ and the macroscopic absorption cross section $\Sigma$ of the given formation. The salinity of the fluid in the formation affects the macroscopic absorption cross section of the formation but has no effect on the porosity of the formation. Consequently, by comparing the signals of the two ratio detectors 41 and 42, an indication is obtained each time there is a change in the salinity of the fluid in the formation. More particularly, when the pores of the formation contain salt water rather than oil, the thermal neutron counting rate ratio from detector 41 increases, while the gamma ray counting rate ratio from detector 42 decreases for a given formation porosity. This effect is illustrated in FIG. 3. The gamma ray counting rate ratio is shown as a dashed line and the thermal neutron counting rate ratio is shown as a solid line. The magnitude of the differential between the two ratios can be further seen to increase as the formation porosity increases, FIG. 3 illustrating examples for 10%, 20%, and 30% porosities of a limestone formation.

Coupled to the outputs of ratio detectors 41 and 42 is the recorder 44. Such a recorder may preferably be a continuous trace recorder having its chart driven continuously in correlation with depth as illustrated in FIG. 1 by means of mechanical connection 45 and measuring reel 46 coupled to cable 47. Cable 47 is wound and unwound upon drum 48 driven by motor 49 and mechanical connection 50 to move the borehole tool through the borehole. The ratio signal from ratio detector 41 is recorded as trace 51 and the ratio signal from ratio detector 42 is recorded as trace 52 as the logging tool is continuously moved through the borehole.

By recording the outputs of the ratio detectors 41 and 42 as continuous traces 51 and 52, respectively, a log is provided on which one can readily observe changes in the differential between the magnitudes of the signals from such detectors and thereby distinguish oil bearing zones from salt water bearing zones with the formation surrounding the borehole since the magnitude of such differential is much larger for a salt water bearing zone than for an oil bearing zone.

Since both the thermal neutron and gamma ray ratios of detectors 41 and 42 vary similarly in zones saturated with either fresh water or oil, either ratio can be calibrated in terms of formation porosity for these fluids. A porosity correction is clearly required for formations containing salt water. Such correction can be obtained by either adding or subtracting from the ratio selected for calibration, in terms of porosity, a suitable proportion of the difference between the two measured ratios. Hence, the separation between the two ratios, as illustrated in FIG. 3, can be used not only to determine oil saturation but also to correct either ratio so that an accurate measurement of porosity can be obtained.

Such correction and porosity determination is accomplished by means of the difference determining means 55 and porosity function former means 56. The difference determining means 55 preferably includes at least one operational amplifier to which are applied the signals from ratio detectors 41 and 42. Feedback and biasing resistors are selected for calibrating the output signal from the operational amplifier. The output of the difference determining means 55 is the difference between the thermal neutron and gamma ray counting ratios. Such difference is applied to the function former means 56 where a portion of such difference is either subtracted from the thermal neutron counting rate ratio or added to the gamma ray counting rate ratio. For purposes of illustration, in FIG. 1 the thermal neutron counting rate ratio from detector 41 is selected by the switch 53. The porosity function former 56 is preferably at least one operational amplifier calibrated with feedback and biasing resistors to select that portion of the difference in the counting ratios required to provide the desired porosity indication, such portion being identified by running the borehole tool in a calibration model.

Although the porosity determination method of the present invention requires a porosity correction due to water salinity variations, it has two distinct advantages over the prior art porosity determinations. Firstly, the ratio response in salt water saturated formation zones can be expected to separate more distinctly when the detector pairs are sensitive to thermal neutrons and thermal neutron capture gamma rays than when epithermal neutrons and thermal neutrons are detected. Consequently, greater sensitivity is possible for differentiating oil from salt water in the formations' rock pore space. Secondly, higher counting rates can be obtained from the combined use of thermal neutron detectors and thermal neutron capture gamma ray detectors than with the combined use of epithermal neutron detectors and thermal neutron detectors. Hence, the resulting log, as illustrated by FIG. 3, will have less statistical error.

In the preferred embodiment of FIG. 1 the thermal neutron detectors 12 and 13 are illustrated as being on the opposite side of the neutron source from the gamma ray detectors 14-15. However, all four detectors may be located on the same side of the neutron source. In either configuration, the distances $d_1$ and $d_2$ of the nearest thermal neutron detector and the nearest gamma ray detector to the source, respectively, do not have to coincide, the only requirement being that the distances $\Delta X$ between the two thermal neutron detectors and between the two gamma ray detectors be approximately the same. In the preferred embodiment, for example, the distance $\Delta X$ is in the range of 20 to 40 centimeters, while the distance $d_1$ and $d_2$ of the nearest thermal neutron detector and the nearest gamma ray detector to the neutron source is in the range of 10 to 20 centimeters.

It is to be understood that various modifications to the disclosed embodiment, as well as alternative embodiments, may become apparent to one skilled in the art without departing from the scope and spirit of the invention as hereinafter as defined by the appended claims.

I claim:

1. A system for logging the formations traversed by a borehole, comprising:
   (a) a borehole tool,
   (b) means for moving said borehole tool through a borehole,
   (c) a steady-rate source of fast neutrons located within said borehole tool for irradiating the formations surrounding the borehole with neutrons,
   (d) a pair of thermal neutron detectors located within said borehole tool at spaced-apart positions from said source,
   (e) a pair of gamma ray detectors located within said borehole tool at spaced-apart positions from said source,
   (f) means for producing a first ratio signal representative of the ratio of the numbers of thermal neutrons measured by said thermal neutron detectors, and
   (g) means for producing a second ratio signal representative of the ratio of the numbers of thermal neutron capture gamma rays measured by said gamma ray detectors.

2. The system of claim 1 further including means for producing a differential signal representative of the difference between said ratio signals to distinguish between oil bearing zones and salt water bearing zones of the formation being logged, said first ratio signal increasing with salinity and said second ratio signal decreasing with salinity.

3. The system of claim 2 further including means for correcting one of said ratio signals to provide a signal indicative of formation porosity by adding a select portion of said differential signal to said ratio signal.

4. The system of claim 2 further including means for correcting one of said ratio signals to provide a signal indicative of formation porosity by subtracting a select portion of said differential signal from said ratio signal.

* * * * *